March 2, 1937.     A. P. HINSKY     2,072,557
FLAME RESISTING CONDUCTOR
Filed June 30, 1933
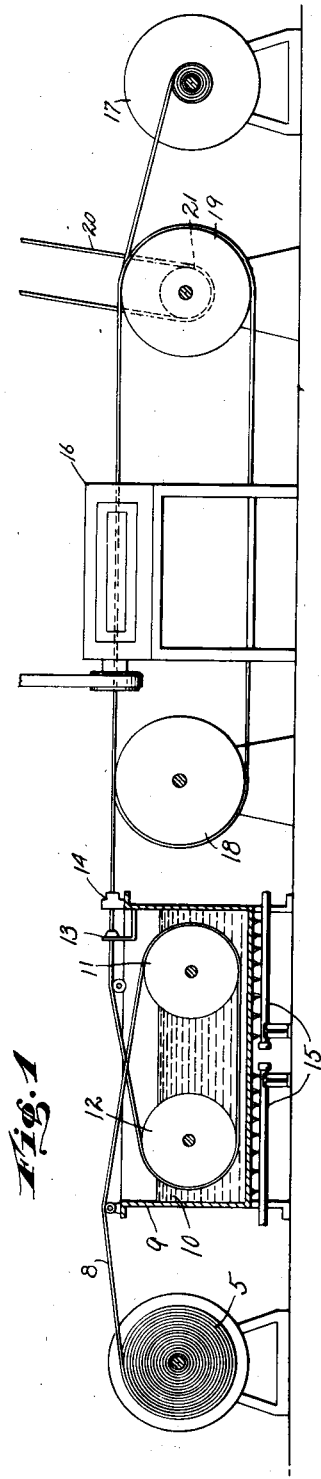
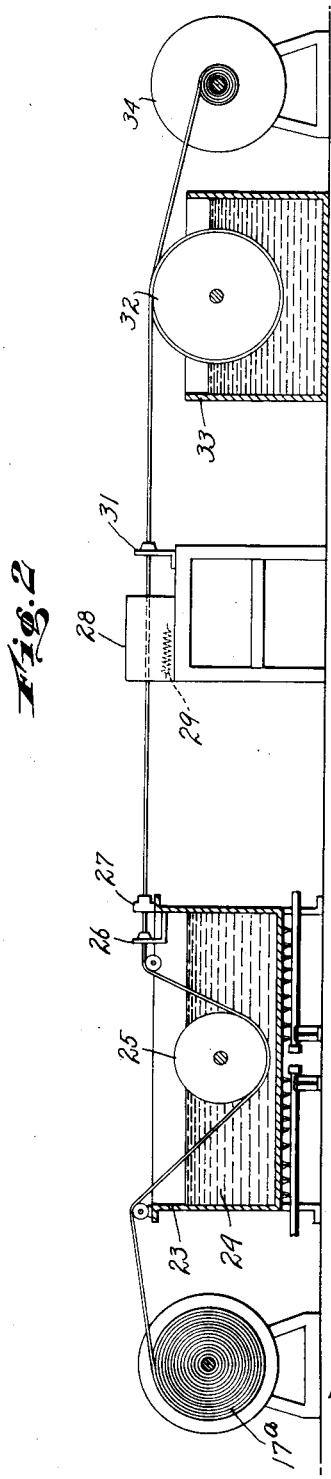
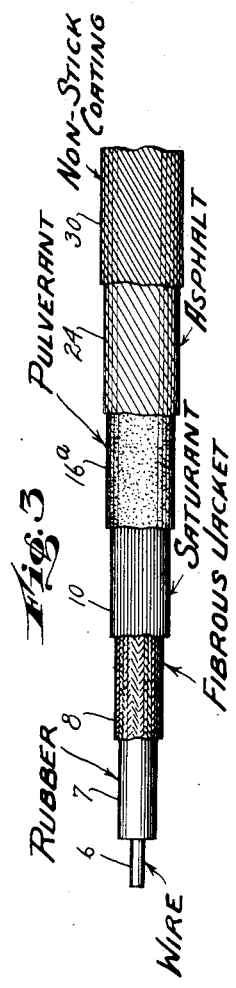
INVENTOR.
ANTHONY P. HINSKY.
BY
ATTORNEYS.

Patented Mar. 2, 1937

2,072,557

UNITED STATES PATENT OFFICE 2,072,557

FLAME RESISTING CONDUCTOR

Anthony P. Hinsky, Brooklyn, N. Y., assignor to Pyro Products Corporation, Brooklyn, N. Y., a corporation of New York Application June 30, 1933, Serial No. 678,396

12 Claims. (Cl. 173—264)

This invention relates to insulated electric conductors; and the object of the invention is to provide an electric conductor, the outer fibrous jacket or casing of which is first treated with a flame proof saturant, after which a coating of asphalt, preferably a high melting point blown or oxidized asphalt, is applied thereto, this asphalt possessing desirable characteristics such as melting point, flexibility, toughness, durability and moisture-proof and water-resisting characteristics, and still further a coating which will establish adhesion to the saturant employed, and finally to the application of a coating of wax or other non-stick, over the asphalt coating; a further object being to provide a product of the class described wherein a suitable powdered substance may be introduced between the saturant and the asphalt or other coating in order to facilitate the production of the conductor in accordance with my method and to prevent the convolutions of the wire treated with the saturant from sticking together prior to the application of the asphalt coating and to otherwise facilitate the handling thereof; a still further object being to provide a conductor produced in accordance with the method herein defined, wherein the asphalt coating may be in the form of a compound consisting primarily of asphalt and other elements or substances combined therewith to modify the characteristics of said coating; and a still further object being to provide a novel method of producing or treating electric conductors of the class described to render the same moisture and fireproof, as is more fully hereinafter described and claimed.

The invention is fully disclosed in the following specification, of which the accompanying drawing forms a part, in which the separate parts of my improvement are designated by suitable reference characters in each of the views, and in which:

Fig. 1 is a diagrammatic view showing the first steps in the process of coating an electric conductor.

Fig. 2 is a similar view showing other steps in the process; and,

Fig. 3 shows a part of an electric conductor diagrammatically illustrating the applications of the saturant or other coatings thereon.

For the purpose of illustrating one means of carrying my improved method into effect, I have diagrammatically illustrated in Figs. 1 and 2 of the drawing, an apparatus for treating or coating the conductor, and in Fig. 1, 5 represents a let-off reel from which the conductor consisting of the wire 6, rubber or other covering 7 and the braided or other jacket 8 passes into a tank 9 containing a saturant 10 and around two sheaves 11 and 12 in said tank, and then upwardly and outwardly through a suitable wiper 13 disposed above the tank and then through an ironing or forming die 14, the tank 9 being heated by suitable burners or heaters 15 to maintain the saturant 10 at the desired temperature.

If the powdered substance is employed on the conductor treated with the saturant, the same is passed through a pulverant applicator 16 of any desired type and thus onto a receiving or take-up reel 17. The conductor also passes over and around idler sheaves or wheels 18 and 19, the latter being driven through a belt 20 and pulley 21. This passage of the conductor around the sheaves before winding onto the reel 17 is to allow the conductor to cool and harden. In this connection, the pulverant is represented on the conductor shown in Fig. 3 as 16a, the saturant being designated at 10.

From the reel 17 or a similar reel 17a, the wire treated with the saturant and/or pulverant is passed into and through another tank 23 containing the asphalt or other material 24, passing around a sheave 25 in said tank, then through a wiper 26 disposed above the tank, and through a die or ironing device 27, then through a spraying device 28, preferably electrically heated as indicated at 29, to apply a wax, paraffin or other non-stick coating 30 to the wire treated with the asphalt 24, after which the conductor thus treated is passed through another die or polisher 31, and then around a sheave 32 in a cold water tank 33, and then onto a receiving or take up reel 34.

It will be understood that my improved method of treating and coating electric conductors of the class described may be performed in a continuous operation, especially in the use of some types of saturants. But, in the present diagrammatic showing, the saturant is first applied and allowed to cool for any desired period of time, and then the finisher coating of asphalt and the coating of wax is applied, the application of the powdered substance or pulverant, such for example, as sodium bicarbonate, sodium tungstate, sodium carbonate and the like being optional and dependent to some degree upon the type of saturant employed. Any of the known commercial types of flame proof saturants may be used, such as, stearin pitch or saturants containing a stearin pitch base. At this time, I wish to point out that the melting point of the saturant may vary, depending upon the particular type of saturant employed, and this is also true with respect to the asphalt or like finisher employed.

The finisher or coating material 24 which I preferably employ is a relatively high melting point, blown or oxidized asphalt, which I have found from experience possesses the desirable moisture proof characteristics as well as adhesion to the saturant and is also desirable from the standpoint of its flexibility, durability and toughness, and furthermore, has high water resisting properties, as well as being low in cost, thus effecting a material saving in the treatment of electric conductors having the black color finish of a smooth and glossy appearance. It will also be understood that a compound may be used wherein other substances could be combined with the blown asphalt, such for example, as gilsonite, wurtzilite, resins, either natural or synthetic, mineral, animal or vegetable oils, bitumen or any bituminous substance, and still further, some of the hard waxes such as carnauba, Montan, candelilla or synthetic may be used, or if desired, steam refined or natural asphalt may be used.

The final or outer coating of non-stick may be a suitable waxy material, but in some cases, it may be desirable to apply to the asphalt coating a coating of lacquer or shellac, and if desired, this coating may be waxed, these outer or final coatings facilitating handling of the conductor without soiling the hands or articles in connection with which the conductor may come in contact, and further, permit easy drawing of the conductor through conduits during installation. These final coatings may also include a black pigment to maintain the black color value of the finisher.

In addition to the low cost of production of the conductor in accordance with my improved method, a further outstanding advantage lies in the fact that the manufacturing of the conductor is facilitated and the dense, solid outside coating of asphalt insures a perfect seal or protection to the conductor, which adheres to the saturant and protects the braid and the flame proof saturant, thus increasing the flame resisting as well as waterproof characteristics of the product, it being understood in this connection that notwithstanding what may happen to the outside finish or coating including the asphalt coating, the flame resisting qualities of the saturant will remain unimpaired.

I am aware of the fact that asphalt has heretofore been used in the treatment of electric conductors as well as a saturant, but at no time, to my knowledge, has asphalt and especially blown asphalt been applied onto an electric conductor previously treated with a flame resisting saturant to produce the simple as well as economical and extremely desirable product herein disclosed, and furthermore, a product having the commercial manufacturing advantages herein set forth.

In the present disclosure, I have applied the method to one type of electric conductor, and it will be understood, however, that my improved method of treatment may be applied to coverings, jackets or sheaths of conductors of various kinds and classes regardless of the specific type of insulating material employed on the wire, and regardless of the kind or type of conductor employed.

It will also be understood that while I have diagrammatically illustrated and described certain steps of the method which I prefer to employ in the production of electric conductors of the class under consideration, I am not necessarily limited in these respects, and various changes in and modifications of the conductor herein disclosed and the method of its production may be made within the scope of the appended claims without departing from the spirit of my invention or sacrificing its advantages.

Having fully described my invention, what I claim as new and desire to secure by Letters Patent, is:

1. In the art of electrical insulation, an insulated electric conductor including a fibrous jacket, said jacket being treated with a flame resistant saturant, and a coating of blown asphalt applied over the saturant treated jacket to form a dense coating protecting the jacket and the saturant applied thereto.

2. In the art of electrical insulation, an insulated electric conductor including a fibrous jacket, said jacket being treated with a flame resistant saturant, a coating of blown asphalt applied over the saturant treated jacket to form a dense coating protecting the jacket and the saturant applied thereto, and a final coating of wax disposed over and enveloping said asphalt coating.

3. In the art of electrical insulation, an insulated electric conductor including a fibrous jacket, said jacket being treated with a flame resistant saturant, a coating of blown asphalt applied over the saturant treated jacket to form a dense coating protecting the jacket and the saturant applied thereto, and a final coating of wax disposed over and enveloping said asphalt coating, the wax coating containing a color pigment.

4. In the art of electrical insulation, an insulated electric conductor including a fibrous jacket, said jacket being treated with a flame resistant saturant, a coating of blown asphalt applied over the saturant treated jacket to form a dense coating protecting the jacket and the saturant applied thereto, a final coating of wax disposed over and enveloping said asphalt coating, and a pulverant disposed on the conductor intermediate the saturant and the asphalt coating.

5. An insulated electric conductor of the class described including a fibrous jacket treated with a stearin pitch saturant, and a high melting point blown asphalt compound arranged on and enveloping said jacket forming a protecting coating for the jacket and the saturant applied thereto.

6. An insulated electric conductor of the class described including a fibrous jacket treated with a stearin pitch saturant, a high melting point blown asphalt compound arranged on and enveloping said jacket forming a protective coating for the jacket and the saturant applied thereto, and a flame resistant pulverant disposed between the saturant treated jacket and said asphalt coating.

7. An insulated electric conductor of the class described including a fibrous jacket treated with a stearin pitch saturant, a high melting point blown asphalt compound arranged on and enveloping said jacket forming a protective coating for the jacket and the saturant applied thereto, and a final coating of wax material disposed over and enveloping said asphalt compound.

8. In the art of electrical insulation, an insulated conductor, the protective covering of which is treated with a flame retarding material, and a continuous dense protective coating of high melting point blown asphalt surrounding and enclosing said treated covering.

9. In the art of electrical insulation, an insulated conductor, the protective covering of which is treated with a flame retarding material, a continuous dense protective coating of high melting point blown asphalt surrounding and enclosing said treated covering, and a final outer non-stick coating.

10. An insulated electric conductor of the class described including a fibrous jacket treated with a stearin pitch saturant, a high melting point blown asphalt compound arranged on and enveloping said jacket forming a protective coating for the jacket and the saturant applied thereto, a final coating of wax material disposed over and enveloping said asphalt compound, and the wax coating containing a color pigment.

11. An insulated electric conductor of the class described including a fibrous jacket treated with a stearin pitch saturant, a high melting point blown asphalt compound arranged on and enveloping said jacket forming a protective coating for the jacket and the saturant applied thereto, a final coating of wax material disposed over and enveloping said asphalt compound, and a flame resistant pulverant disposed between the saturant treated jacket and said asphalt coating.

12. In the art of electrical insulation, an insulated conductor, the protective covering of which is treated with a flame resistant saturant, a continuous dense protective coating of high melting point blown asphalt surrounding and enclosing said treated covering, a flame resistant pulverant disposed between the saturant and asphalt, and a final non-stick outer coating.

ANTHONY P. HINSKY.